US011287505B2

(12) United States Patent
Densham et al.

(10) Patent No.: US 11,287,505 B2
(45) Date of Patent: Mar. 29, 2022

(54) ELECTRONIC TRACKING DEVICE AND RELATED SYSTEM

(71) Applicant: CAST Group of Companies Inc., Toronto (CA)

(72) Inventors: Gilray Densham, Inglewood (CA); Andrew Gordon, Toronto (CA)

(73) Assignee: CAST GROUP OF COMPANIES INC., Toronto (CA)

( * ) Notice: Subject to any disclaimer, the term of this patent is extended or adjusted under 35 U.S.C. 154(b) by 0 days.

(21) Appl. No.: 15/930,744

(22) Filed: May 13, 2020

(65) Prior Publication Data

US 2020/0363490 A1 Nov. 19, 2020

Related U.S. Application Data

(60) Provisional application No. 62/847,146, filed on May 13, 2019.

(51) Int. Cl.
G01S 1/00 (2006.01)
G01S 5/00 (2006.01)
G01S 1/70 (2006.01)
G01S 5/16 (2006.01)

(52) U.S. Cl.
CPC .............. G01S 1/7036 (2019.08); G01S 5/16 (2013.01)

(58) Field of Classification Search
USPC ....................................................... 356/141.3
See application file for complete search history.

(56) References Cited

U.S. PATENT DOCUMENTS

| 5,347,387 | A | * | 9/1994 | Rice | H04B 10/1125 |
| | | | | | 250/203.2 |
| 7,705,736 | B1 | * | 4/2010 | Kedziora | A01K 29/005 |
| | | | | | 340/573.3 |
| 9,350,923 | B2 | * | 5/2016 | Densham | G06T 7/586 |
| 9,747,697 | B2 | * | 8/2017 | Densham | H04N 9/3194 |
| 2002/0114076 | A1 | * | 8/2002 | Dickson | G02B 19/0014 |
| | | | | | 359/566 |
| 2002/0158131 | A1 | * | 10/2002 | Dickson | G02B 26/106 |
| | | | | | 235/462.34 |
| 2004/0016812 | A1 | * | 1/2004 | Schmidt | G06K 7/10594 |
| | | | | | 235/462.31 |
| 2005/0127185 | A1 | * | 6/2005 | Wilz, Sr. | G06K 7/10673 |
| | | | | | 235/462.48 |
| 2007/0192910 | A1 | * | 8/2007 | Vu | B25J 19/06 |
| | | | | | 700/245 |
| 2012/0235579 | A1 | * | 9/2012 | Chemel | F21V 21/15 |
| | | | | | 315/152 |
| 2014/0320667 | A1 | * | 10/2014 | Densham | H04N 9/3194 |
| | | | | | 348/169 |
| 2015/0097946 | A1 | * | 4/2015 | Stout | H04N 5/222 |
| | | | | | 348/135 |
| 2016/0196667 | A1 | * | 7/2016 | Densham | H04N 9/315 |
| | | | | | 348/169 |
| 2017/0363741 | A1 | * | 12/2017 | Send | G01S 17/46 |

* cited by examiner

*Primary Examiner* — James R Hulka

(57) ABSTRACT

A tracking beacon is provided that is trackable using image sensors. The beacon includes a housing with a lower portion and an upper portion. The upper portion include a light diffusing structure with protrusions to help scatter the emitted light in different directions. A light source is positioned within the housing, and electrical contacts are positioned on an external surface of the lower portion.

20 Claims, 8 Drawing Sheets

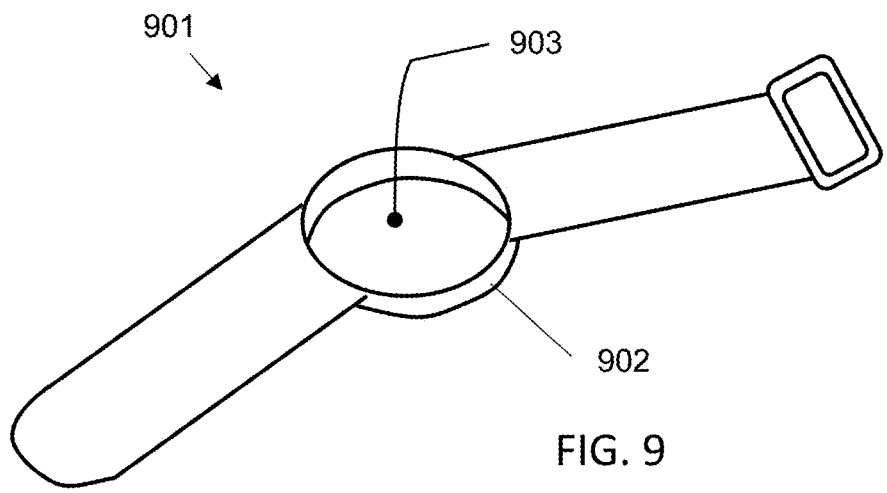
FIG. 9
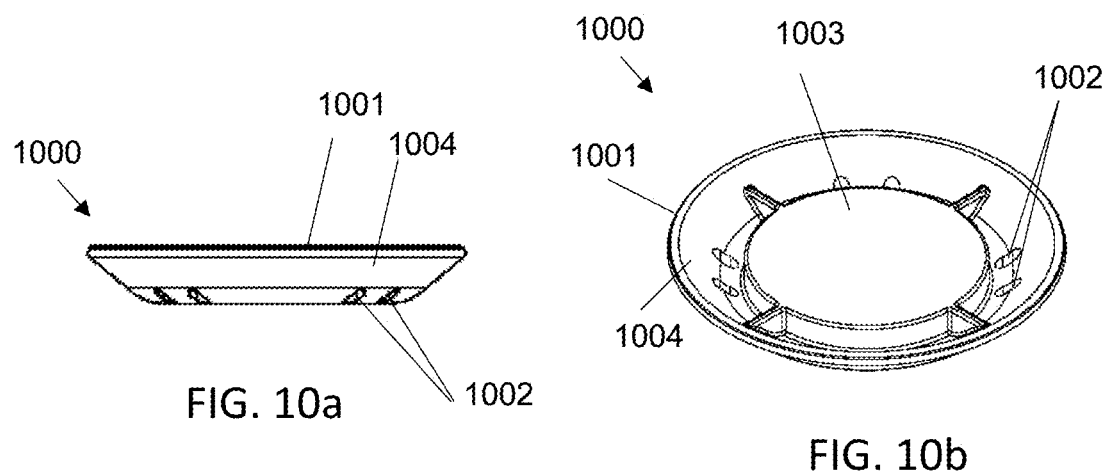
FIG. 10a
FIG. 10b
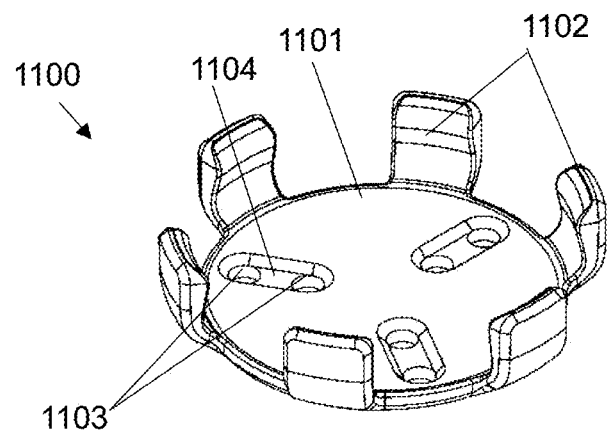
FIG. 11

ELECTRONIC TRACKING DEVICE AND RELATED SYSTEM

CROSS-REFERENCE TO RELATED APPLICATIONS

This application claims priority to U.S. Provisional Patent Application No. 62/847,146 filed on May 13, 2019 and titled "Electronic Tracking Device And Related System", the entire contents of which are herein incorporated by reference.

TECHNICAL FIELD

The following generally relates to an electronic tracking device that is trackable by image sensors.

DESCRIPTION OF THE RELATED ART

Tracking objects in a physical space can be difficult, as people and things move freely and sometimes unexpectedly. Tracking the motion and position of people things accurately is difficult. Tracking can take place using cameras that track markers.

BRIEF DESCRIPTION OF THE DRAWINGS

Embodiments will now be described by way of example only with reference to the appended drawings wherein:

FIG. 5b is a cross-section view of the top portion taken along the line A-A shown in FIG. 5a.

FIG. 9 is an example embodiment of a watch accessory that removably holds a tracking beacon.

FIGS. 10a and 10b are a side view and a perspective view of a magnetic clip that holds a tracking beacon, according to an example embodiment.

FIG. 11 is a perspective view of a snap clip that holds a tracking beacon, according to an example embodiment.

DETAILED DESCRIPTION

Figure 1:
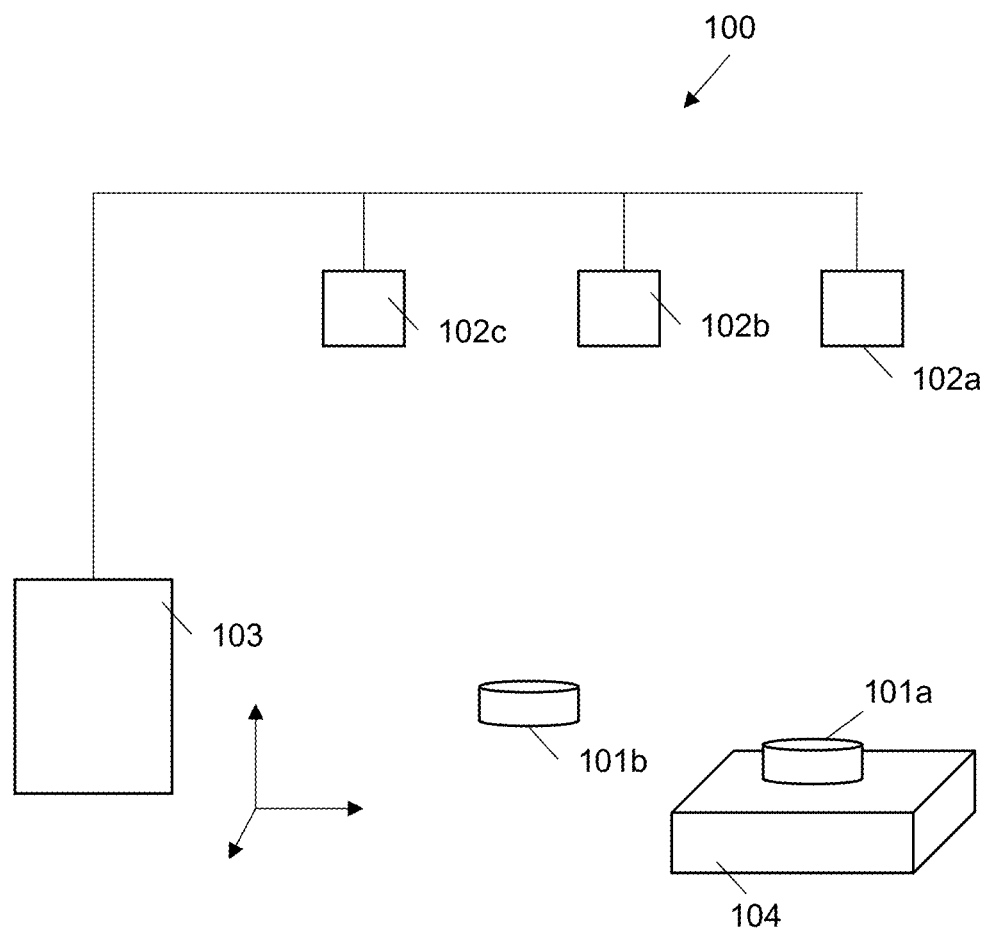
FIG. 1 is a schematic diagram of an example of a tracking system that includes tracking beacons and tracking sensors.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

FIG. 1 shows a tracking system 100 that tracks the position and movement of tracking beacons 101a, 101b, also herein called "beacons". A beacon is more generally referenced with reference numeral 101. Although two beacons are shown, it will be appreciated that the tracking system 100 can track one beacon or can simultaneously many beacons.

A beacon 101 emits light that is detected by one or more cameras. Preferably, there are two or more cameras to track a beacon in multiple dimensions. For example, the cameras 102a, 102b, 102c are positioned overhead and capture images of the light emitted from a given beacon. A computing system 103 receives the images from the cameras then processes the images using image recognition to identify the position of the light sources in the image. The position information from the different cameras are then compared (e.g. using triangulation) by the computing system 103 to determine the location of the given beacon in three-dimensional space.

In an example aspect, the beacons emit infrared light and the cameras 102a, 102b, 102c detect the infrared light. In other words, the cameras are infrared cameras. In an alternative embodiment, a light in a different range of the light spectrum is emitted and is detected by the cameras 102a, 102b, 102c.

The beacon 101a and the beacon 101b emit light at a different blinking pattern or blinking frequency. The blinking pattern or the blinking frequency represents an identifier (ID) that is specific to each beacon. In other words, the beacon 101a has a first ID and accordingly blinks according to a first blinking pattern or blinking frequency that is associated with the first ID, and the beacon 101b has a second ID and accordingly blinks according to a second blinking pattern or blinking frequency that is associated with the second ID.

In other words, over a series of images, the computing system 103 is able to detect the blinking pattern of the a given beacon to identify its associated ID. In this way, the computing system is able to track the position and movement of multiple beacons simultaneously.

As shown in FIG. 1, a beacon 101a can be attached to an object 104 (e.g. a person or a thing) so as to track the position of the object. In an example aspect, the tracking of the beacon or beacons is performed in real-time.

As shown in FIG. 1, the beacons 101a, 101b are low-profiled electronic devices that can be attached to objects. It is desirable that these beacons are small, attachable and convenient to use. In FIG. 1, the beacons are shown as cylindrical discs. However, other shapes can be used to form the beacon, such as a rectangular prism, a square, an pentagonal prism, a triangular prism, a hexagonal prism, an octagonal prism, or some other polygonal shape. In an example embodiment, the beacon's housing has an irregular shape, including curves and different facets.

In an example embodiment, the beacons are small so that they fit within a person's hand. In another example embodiment, the beacons are small enough to fit on a person's wrist, like the face of a watch. It will be appreciated that different sizes of the beacon are applicable to the principles described herein.

In an example aspect, the beacons 101a and 101b are each self-contained devices that integrate all the components, including the light emitter, within a beacon housing. In other words, a beacon does not have different housings or parts attached to each other with external wires. This self-contained device is a very convenient and easy-to-use form factor. It is also robust.

Figure 2:
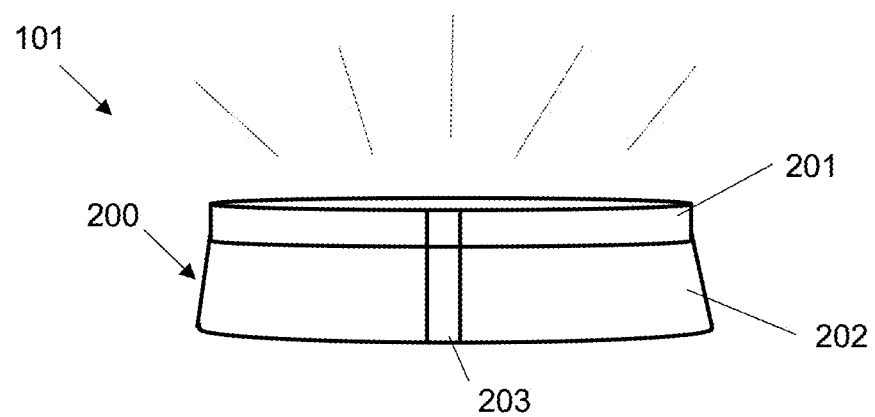
FIG. 2 is an example embodiment of a tracking beacon.

FIG. 2 shows another example embodiment of a beacon 101. The beacon includes a housing 200 that has a first portion 202 and a second portion 201. The second portion 201 includes a light diffusing structure. One or more light sources (e.g. light emitting diodes (LEDs)) are positioned within the housing and light is emitted through the second portion 201. For example, the one or more light sources are infrared LEDs. The light diffusing structure helps for the tracking cameras 102a, 102b, 102c to more easily capture the light emitted from the beacon 101.

In the examples described herein, the first portion 202 is referred to as a lower portion, and the second portion 201 is referred to as an upper portion. However, it will be appreciated that a beacon's orientation of upper and lower can change. In general, it is desirable to have the light diffusing structure oriented so that one or more tracking cameras can see the light emitted from the beacon.

In an example aspect, the light diffusing structure includes translucent portions and helps to scatter the light in different directions. In another example embodiment, the entire upper portion 201 is translucent to scatter the light in different directions.

Figure 3:
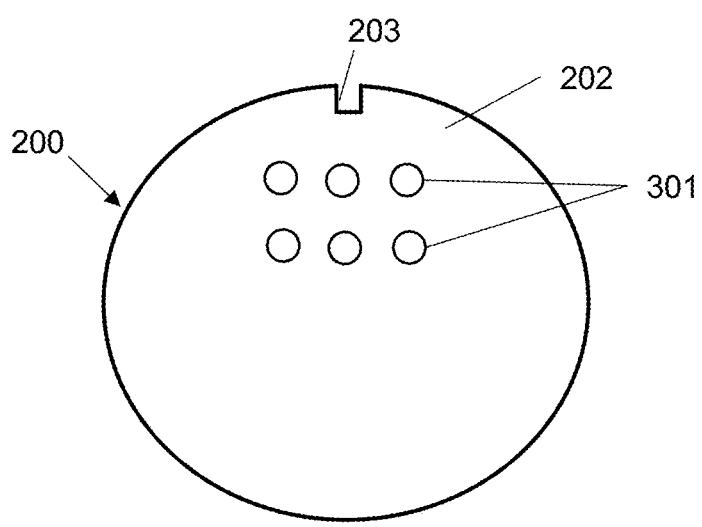
FIG. 3 is a bottom view of the tracking beacon shown in FIG. 2.

FIG. 3 shows the bottom surface of the lower portion 202 of the housing and it includes, for example, are electrical contacts 301. The electrical contacts do not necessarily need to be on the bottom surface of the lower portion. In other example embodiments, the electrical contacts are located on the lower portion 202 (e.g. side surface or bottom surface, or both).

The electrical contacts 301 are for transferring power and data. In particular, some electrical contacts are for power (e.g. also herein called power electrical contacts) and some electrical contacts are for data (e.g. also herein called data electrical contacts). In a further example aspect, the data electrical contacts include at least one contact for receiving a time synchronization signal. In a further aspect, the data electrical contacts electrical contacts receive a time synchronization signal and a data (e.g. beacon ID data).

In an example embodiment, the data electrical contacts include an electrical contact for receiving a command to reset a processor of the beacon (see FIG. 6), an electrical contact to receive a time synchronization signal to synchronize a time keeper of the beacon (see FIG. 6), an electrical contact to receive data, and an electrical contact to transmit data. In an example aspect, the received data and the transmitted data are received or transmitted using serial communications.

Figure 6:
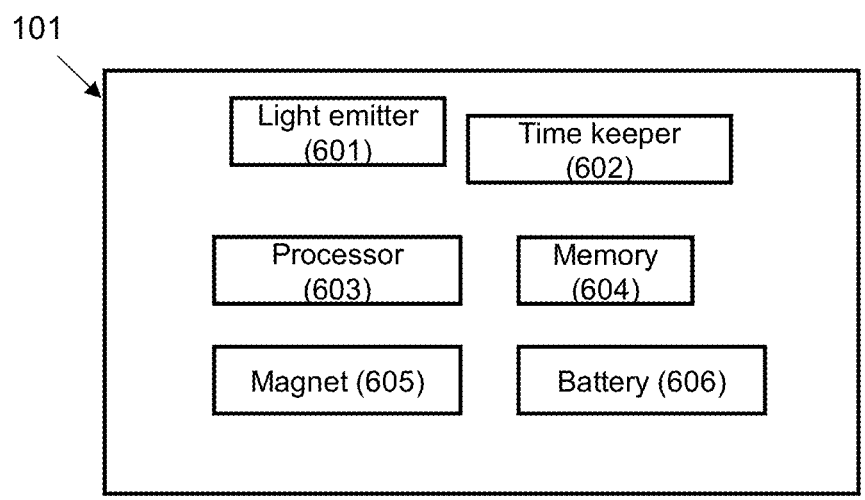
FIG. 6 is an example embodiment of components in a tracking beacon.

In an example embodiment, the power electrical contacts include a common ground electrical contact and an input power electrical contact for charging the battery of the beacon (see FIG. 6).

Also shown in FIG. 3 is that the electrical contacts 301 are offset from a center vertical axis of the housing.

In an example embodiment, an indent forms a notch 203 along the side wall of the housing 200 to orient the beacon. The notch continues from the lower portion 202 to the upper portion 201. The electrical contacts 301 are, for example, positioned closer to the notch 203. The notch is used to orient the beacon within a charging slot, which has contacts that align with the electrical contacts 301 on the beacon. It will be appreciated that there are alternative ways to use complimentary shapes (e.g. male and female keying) to orient the beacon within a charging slot, and these alternatives are applicable to the principles described herein.

Also shown in FIG. 2 is that the lower portion 202 has side walls that taper inwards from a bottom of the lower portion to the top of the lower portion. In a further example aspect, the lower portion is rounded and, more particularly, the lower portion has a frustoconical shape.

In another example aspect, the lower portion 202 is opaque and the upper portion 201 is translucent.

Figure 4:
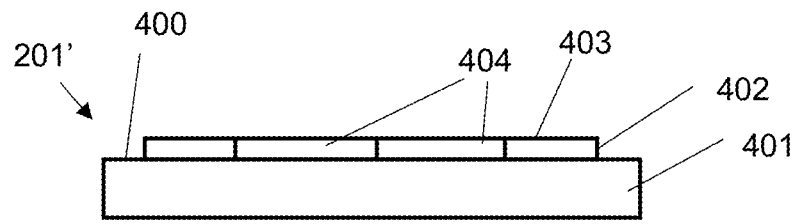
FIG. 4 is a side view of a top portion of a tracking beacon shown in isolation, according to an example embodiment.

Turning to FIG. 4, another example embodiment of an upper portion 201' is shown in isolation from a side view. It includes a first side wall 401 that leads to a first top surface 400, then one or more protrusions 402 that extend therefrom. The top of the protrusion 402, for example, defines a second top surface 403 that is raised above the first top surface 400. Although not shown, another protrusion can extend from the second top surface 403. The layers of protrusions create a multiple facets in the upper portion to help scatter the light emitted from the beacon. The side walls of the protrusion 402 can also include multiple facets 404 angled in different direction to help scatter the light. In other words, the upper portion has multi-faceted surfaces that help scatter the light.

Figure 5A:
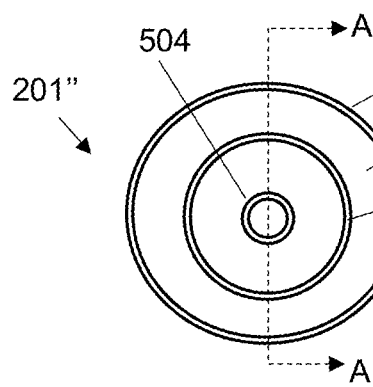
FIG. 5a is a bottom view of a top portion of a tracking beacon shown in isolation, according to another example embodiment.
Figure 5B:
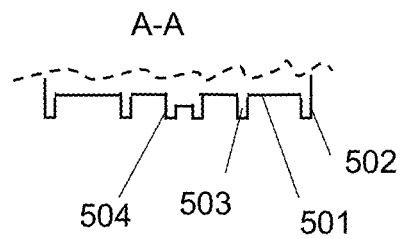

Turning to FIGS. 5a and 5b, protrusions can extend downwards from the bottom of the housing's upper portion 201". In particular, FIG. 5a shows an example of an underside surface of an upper portion 201" shown in isolation, according to another example embodiment. In other words, this underside surface is not visible when the upper portion 201" is attached to the lower portion 202. FIG. 5b shows a side-view cross-section taken along the line A-A shown in FIG. 5a. The top surface of the upper portion 201" is not shown as the top surface can have different configurations. For example, the top surface of the upper portion can resemble the top surface configuration shown in FIG. 4.

The underside surface 501 has one or multiple protrusions 502, 503, 504 that protrude downwards. These protrusions help to scatter the light. The protrusions are shown as concentric rings. However, other shapes of protrusions can be used including bumps, divots, craters, and ridges.

In an example aspect, these protrusions on the top surface or the underside surface, or both, are translucent.

In another example aspect, there are one or more translucent protrusions that protrudes downwards from the underside surface of the light diffusing structure. In another example aspect, there are multiple translucent protrusions that include upward facing protrusions that protrude upwards from an upper surface of the light diffusing structure.

Turning to FIG. 6, an example embodiment of components in a beacon 101 is shown. The components include one or more light emitting devices 602, a time keeper 602, a processor 603, memory 604, and a battery 606. In another example, a magnetic component 605 is also part of the beacon 101.

The one or more light emitting devices 602, for example, emit infrared light. The time keeper 602, for example, includes an oscillator. In a further aspect, the oscillator is a crystal. The time keeper receives a time synchronization signal (e.g. from a charging station or another external device) and uses this time synchronization signal to calibrate the oscillator. In another example aspect, the processor 603 and the memory 604 are parts of a microcontroller in the beacon. In a further aspect, the battery 606 is a rechargeable battery.

The processor and the time keeper control the blinking or strobing of the one or more light emitting devices. The memory, for example, stores the information about the blinking pattern or blinking frequency. In an example aspect, the one or more electrical contacts provide data that presents how fast the one or more light emitting devices strobe. For example, the one or more light emitting devices can be preset to strobe from 1 millisecond to 8 milliseconds. The strobing time length is adjustable. The range of time provided herein is just an example, and the upper and lower times of the range can be varied in different example embodiments.

In an example aspect, the ability to adjust the strobe time allows the system to adapt to different operating conditions. For example, the strobe time of the light emitting device is lowered to save on battery life, such as when the cameras 102a, 102b, etc. can sufficiently detect the light of the beacon at lower brightness. In another example, if the cameras require a higher level of brightness to detect the light emitted from a beacon, then the beacon is preset to a longer strobe time to increase the brightness.

In an example embodiment, the magnetic component 605 is a permanent magnet. In another example, the magnetic component 605 is a material that is magnetically attracted to other magnetic components that are positioned in accessories, such as a magnetic holder (see FIGS. 10a, 10b) and a charging slot of a charging station (see FIG. 13). In an example aspect, the magnetic component does not have to be a permanent magnet and can be a material such as steel or iron.

Figure 13:
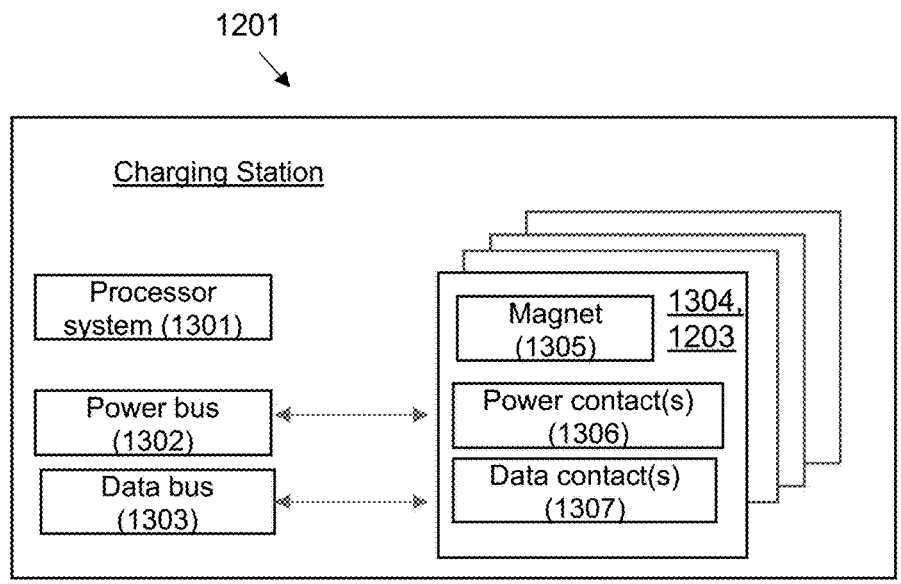
FIG. 13 is an example embodiment of components in the charging station.

In another example, the magnetic component 605 is a permanent magnet and has its magnetic polarity oriented so that it is magnetically attracted to other permanent magnets that are positioned in accessories, such as a magnetic holder (see FIGS. 10a, 10b) and a charging slot of a charging station (see FIG. 13).

In an example aspect, the magnetic component 605 is offset from a center vertical axis of the housing 200. A complimentary magnetic component in a charging slot (of a charging station) is also offset so as to help align electrical contacts on the beacon 101 with complimenting electrical contacts on the charging station.

In another example aspect, the magnetic component 605 is positioned at or near the bottom of the lower portion 202 of the housing.

It will be appreciated that the form factor or housing of the beacon 101 can differ from what is shown in the drawings. It will also be appreciated that, in some embodiments, the beacon 101 does not include a magnet.

Figure 7A:
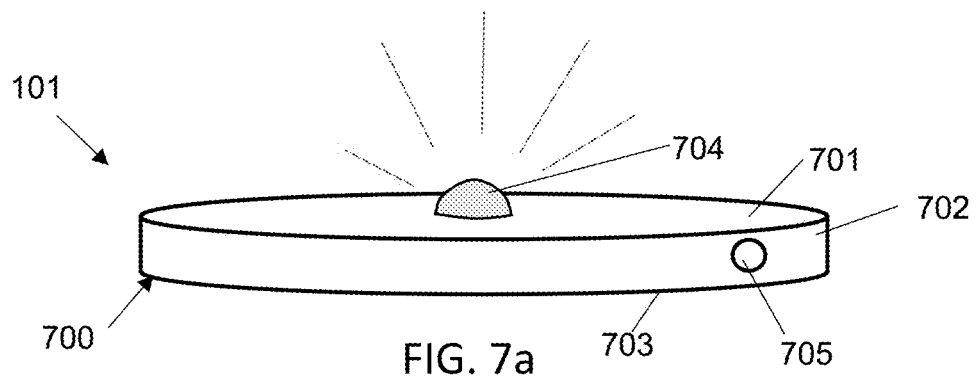
FIGS. 7a and 7b are a perspective view and a side view of another example embodiment of a tracking beacon.
Figure 7B:
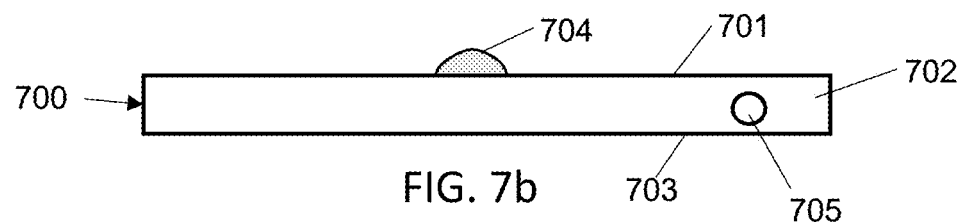

Turning to FIGS. 7a and 7b, another example embodiment of a beacon 101 is shown with a different housing 700. The housing 700 has an upper surface 701 and a lower surface 703, which are connected by a side wall 702 that extends between the upper and lower surfaces 701 and 703. The beacon housing 700 is relatively flat. A light emitter 704 is positioned at the upper surface 701. In an example embodiment, the light emitter emits infrared light. In a further example aspect, the light emitter is a light emitting diode (LED). For example, the light emitter 704 is an infrared LED. In this example, one light emitter 704 is shown. However, in other examples, there may be multiple light emitters positioned at the surface of the beacon housing 700. The light emitters emit light that are tracked by the tracking cameras 102a, 102b, 102c.

In the example shown, a wire connection port 705 is positioned on the housing 700. The wire connection port 705 receives a wire (not shown) that transmits power and data to the beacon. For example, the wire connection port 705 has electrical connections that receive power and one or more electrical connections that receive data. In an alternative embodiment, the housing 700 has different electrical contacts for transmitting power and data, like the electrical contacts 301 shown in FIG. 3.

It will be appreciated that the beacon housing 700 is shown to have a circular top-down profile in the perspective view shown in FIG. 7a. However, in other example embodiments, the beacon housing 700 has a square shape top-down profile, or a pentagon shape top-down profile, or a rectangular shape top-down profile, or a triangle shape top-down profile, or a hexagon shape top-down profile, or some other shape. In other words, the shape of the housing can differ from what is shown.

Figure 8:
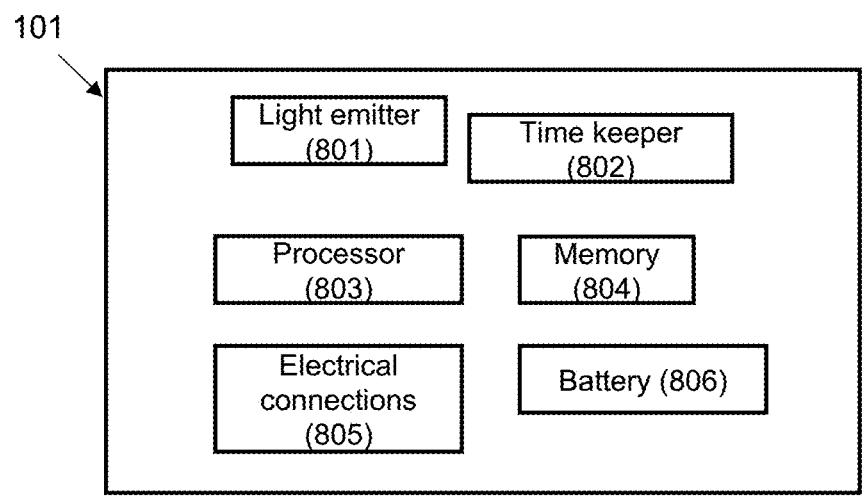
FIG. 8 is another example embodiment of components in a tracking beacon.

Turning to FIG. 8, another example embodiment of components in a beacon 101 is shown, such as the components that are in the housing 700 shown in in FIGS. 7a and 7b. In an example aspect, there are no magnets within the housing. The components include one or more light emitting devices 801, a time keeper 802, a processor 803, memory 804, and a battery 806. Electrical connections 805, which interface with the wire connection port 705, receive power and data that connect to these different components.

The one or more light emitting devices 801, for example, emit infrared light. The time keeper 802, for example, is a clock that includes an oscillator. In a further aspect, the oscillator is a crystal. The time keeper receives a time synchronization signal (e.g. via the electrical connection 805) and uses this time synchronization signal to calibrate the oscillator. In another example aspect, the processor 803 and the memory 804 are parts of a microcontroller in the beacon. Data, such as a beacon ID, is received via the electrical connection 805, and this data is used to define the blinking pattern of the light emitter to represent the beacon ID. In a further aspect, the battery 606 is a rechargeable battery which receives a power charge via the electrical connection 805. The data provided via the electrical connection 805 can be used, for example, to preset the strobe length of time. For example, the strobe length of time be decreased to save on battery power. On the other hand, the strobe length of time can be preset at a longer time to increase the brightness level of the light emitted.

Turning to FIG. 9, a wearable strap 901 is shown in isolation and it includes a housing 902 to removably hold a beacon 101. The housing 902 defines a void 903 therein, and the beacon can be inserted into the void and removed from the void. One or more straps extend from the housing 902. The wearable strap 901 is used to conveniently attach a beacon onto a person or a thing. For example, the wearable strap 901 can be worn on the wrist of a person. In another example, a person wears a first wearable strap assembled with a first beacon on one wrist, and a second wearable strap assembled with a second beacon on another wrist. In this way, the movement of the person's arms can be individually tracked. Either in addition or in alternative, the person wears a third wearable strap assembled with a third beacon on one ankle, and a fourth wearable strap assembled with a fourth beacon on the other ankle, so that the person's leg movements can be individually tracked.

In this example shown, the housing 902 is circular to receive a circular-shaped beacon 101. However, in another example embodiment, such as a square-shaped beacon, the housing 902 is also square-shaped to hold the square-shaped beacon. More generally, the void defined by the housing of the wearable strap is shaped to receive the shape of the housing of the beacon 101.

FIG. 10a and FIG. 10b show a magnetic holder 1000 that hold a beacon using magnetic force. This magnetic holder is applicable to beacons that have a magnet. The magnetic holder includes a body 1001 and a magnetic component 1003 held within in the body 1001. The magnetic component 1003 in the magnetic holder 1000 and the magnetic component 605 in a beacon are magnetically attracted to each other and hold the beacon to the magnetic holder together.

At or near the bottom of the magnetic holder's body are sew-through holes 1002 that are used to attach the magnetic holder to material (e.g. fabric, textile, sheets, clothing, etc.).

The body 1001 of the magnetic holder includes a perimeter wall 1004 that protrudes higher than the magnetic component 1003, and the perimeter wall is shaped to encompass at least part of the lower portion 202 of the housing of the beacon. In an example aspect, the perimeter wall 1004 is angled outwards. The perimeter wall helps to hold the beacon in place, from sliding away from the magnetic component 1003.

In an example use, the magnetic holder can be placed on one side of a fabric and the beacon is placed on the opposite side of the fabric. Under magnetic force, the beacon and the magnetic holder pull towards each other and clamp the fabric there between. In other words, the magnetic holder can be used to attach a beacon to a person's clothing without sewing or without puncturing the person's clothing.

In another example use, the magnetic holder is sewed on to a fabric, and a beacon is removably placed onto the magnetic holder. In other words, the magnetic holder 1000 can be sewn to a person's clothing or some other material. In this way, a beacon that has a magnet can be easily attached to and removed from a person's clothing or some other material, where the person's clothing or the material has attached on it the magnetic holder 1000.

In this example shown, the magnetic holder 1000 is circular to receive a circular-shaped beacon 101. However, in another example embodiment, such as a square-shaped beacon, the magnetic holder 902 is also square-shaped to hold the square-shaped beacon. More generally, the magnetic holder is shaped to receive and hold the shape of the housing of the beacon 101.

Turning to FIG. 11, an example of a snap clip 1100 is shown is isolation.

The snap clip 1100 includes a planar body 1101 and multiple resilient protrusions 1102 that extend upwards from the planar body. The beacon 101 removably is held in the snap clip 1100 by placing the beacon between the multiple resilient protrusions 1102, and the multiple resilient protrusions resiliently flex outwards around the housing of the beacon.

In an example aspect, multiple sew-through holes 1103 are defined in the planar body to attach the snap clip to material (e.g. fabric, textiles, clothing, etc.).

In an example embodiment, two or more sew-through holes 1103 counter-sunk below the surface of the planar body 1101. More particularly, a surface 1104 between the two or more sew-through holes is lower than the surface of the planar body 1101. In this way, thread passing through the holes 1103 does not protrude above the surface of the planar body 1101.

In this example shown, the snap clip 1100 and the protrusions 1102 are arranged in a circular manner to receive a circular-shaped beacon 101. However, in another example embodiment, such as a square-shaped beacon, the snap clip has protrusions 1102 that are arranged to receive the square-shaped beacon. More generally, the void defined by the protrusions are arranged in configuration to receive the shape of the housing of the beacon 101.

Figure 12:
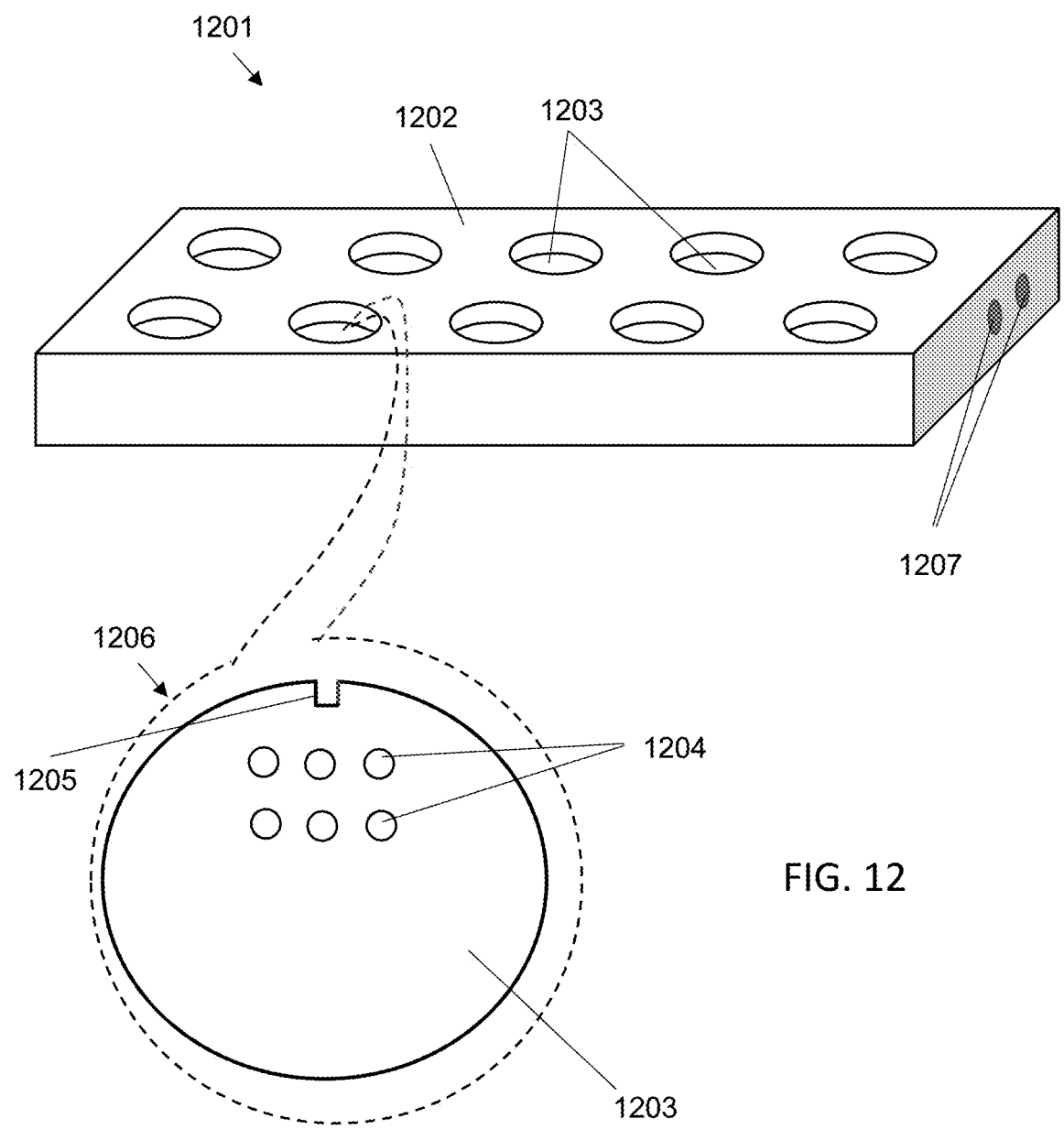
FIG. 12 is a perspective of a charging station that is configured to charge one or multiple tracking beacons, according to an example embodiment.

Turning to FIG. 12, an example embodiment of a charging station 1201 is shown. The body 1202 of the charging station has defined therein one or more charging slots 1203. In an example embodiment, the charging slots 1203 are shaped to compliment the shape of the beacon. For example, if the beacon is circular, then the charging slot is circular and is sized to receive the beacon.

In an example embodiment, there is one charging slot in a charging station. In another example embodiment, there are two or more charging slots in a charging station. In an example embodiment, there are three or more charging slots in a charging station. In an example embodiment, there are six or more charging slots in a charging station. In another example embodiment, there ten or more charging slots in a charging station.

As shown in an example top-down view 1206 of a given slot 1203 in isolation, each of the charging slots include electrical contacts 1204 that are complimentary in position to the electrical contacts 301 of a given beacon 101. In this way, when a beacon is inserted into the charging slots, the electrical contacts 301 contact the electrical contacts 1204 of the charging slot.

The electrical contacts 1204 include power electrical contacts for providing power to a given beacon and data electrical contacts for providing data to the given beacon.

In another example aspect, each of the charging slots include a magnetic component to magnetically attract the given beacon.

In another example aspect, the data electrical contacts and the power electrical contacts are offset to one side of the charging slot, and the magnetic component is offset to the same one side of the slot. This configuration uses magnetic force to align the electrical contacts on the beacon to the electrical contacts on the charging slot.

In an example aspect, each charging slot includes a protrusion 1205 or notch that compliments the feature of the notch 203 in a beacon, in order to facilitate alignment.

The charging station 1201 also includes data and power ports 1207.

In the example shown in FIG. 12, the charging slots are circular to receive a circular shaped beacon. However, in other example embodiments in which the beacon has a different shape, the charging slots are also shaped to match the shape of the beacon. For example, if the beacon housing is square shaped, then the charging slot is square shaped to receive the square-shaped beacon housing.

Turning to FIG. 13, example components of a charging station are provided. A processor system 1301 manages the operation of the charging station. There are multiple charging slot modules 1304 and each one corresponds to a different charging slot 1203. Each charging slot module 1304 includes a magnetic component 1305, power electrical contacts 1306 and data electrical contacts 1307. A power bus 1302 connects to all the power electrical contacts 1306 of all the charging slot modules. A data bus connects to all the data contacts 1307 of all the charging slot modules.

While a beacon is inserted into a charging slot, the charging station charges the battery of the beacon and synchronizes the time keeper of the beacon. The charging station can also modify the tracking ID of the beacon, or the blinking pattern of the beacon, or the blinking frequency of the beacon, or a combination thereof.

The charging station, for example, provides the same time synchronization signal to all the beacons in the charging slots.

In another example aspect, the charging station is able to provide different data (e.g. different commands, different tracking IDs, etc.) to different charging slots. In this way, different beacons in a given charging station can be assigned different IDs and different blinking patterns.

In an example aspect, at least one of the data electrical contacts 1307 provides a time synchronization signal to a given beacon that is inserted into a given charging slot.

In another example aspect, the data electrical contacts 1307 provide a time synchronization signal and tracking identity data to the tracking beacon.

In an example embodiment, the data electrical contacts 1307 include an electrical contact for transmitting a command to reset a processor of the beacon, an electrical contact to transmit a time synchronization signal to synchronize a time keeper of the beacon, an electrical contact to transmit data to the beacon, and an electrical contact to receive data from the beacon. In an example aspect, the received data and the transmitted data are received or transmitted using serial communications.

In an example embodiment, the power electrical contacts 1306 include a common ground electrical contact and a power electrical contact for charging the battery of the beacon.

In operation, after a beacon is inserted into a charging slot, the charging slot automatically starts transmitting a time synchronization signal to the beacon. In an example aspect, no additional steps are required to synchronize the time keeper of the beacon. In other words, a user jams or inserts the beacon into the charging slot and the beacon is then synchronized, which is very easy to operate and convenient.

In an example embodiment, the charging station 1201 has an internet protocol (IP) address.

In an example aspect, another computer device can access the charging station 1201 to determine which beacons are connected to the charging station, and determine which particular beacon (having a beacon tracking ID) is located in a particular charging slot on the charging station. For example, this information can be viewed via a software on the computer device.

In another example, the charging station can also pass a time synchronization signal to other connected charging stations. For example, the charging stations can be networked together in a daisy-chain configuration.

In another example aspect, the charging station has a lid to cover the top surface over the charging slots.

Figure 14:
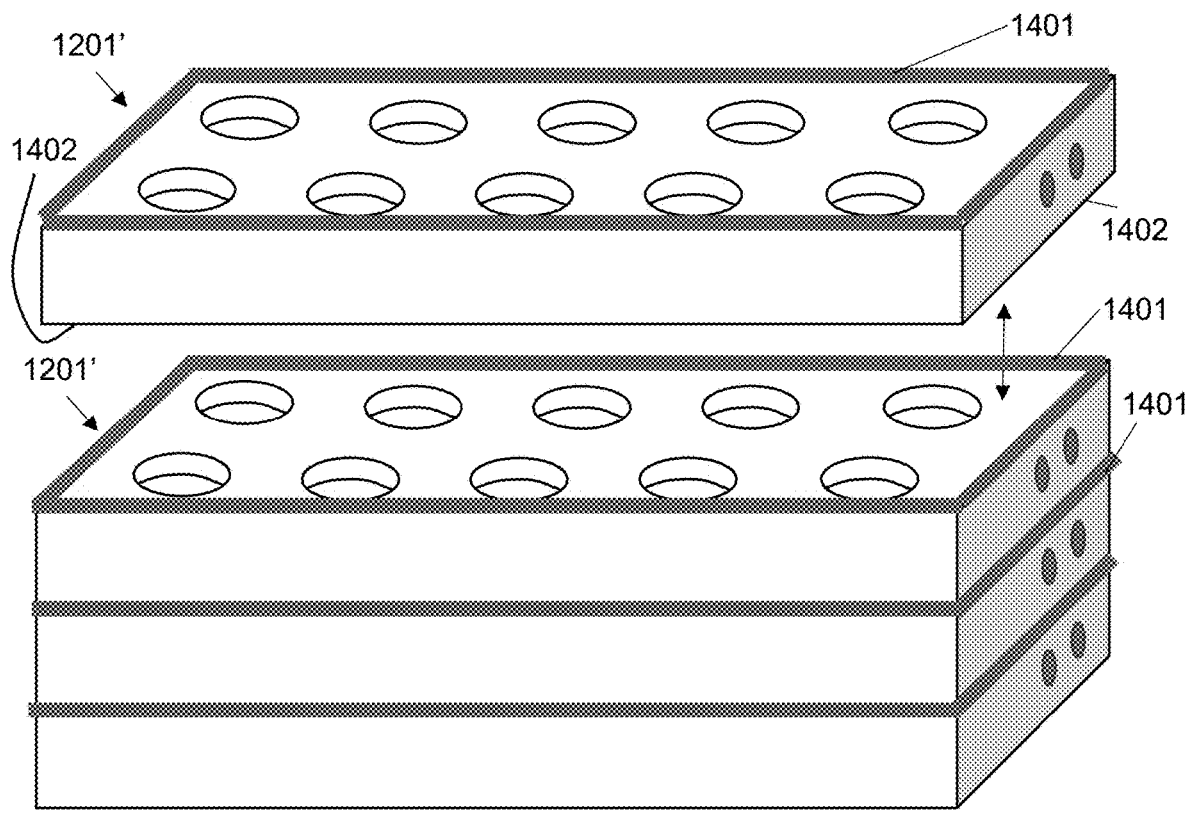
FIG. 14 is an example embodiment of multiple charging stations stacked upon each other.

Turning to FIG. 14, an example embodiment of a charging station 1201' include protrusions and reliefs on the top or the bottom surfaces (or both) of each charging station, so that the charging stations can be stacked on top of each other.

For example, a raised lip 1401 is positioned on the outer top edge of the charging station. The bottom edges 1402 of the charging station are nested within the raised lip 1401. This helps to keep the charging stations from sliding off each other when they are stacked.

In an example embodiment, the side walls of a charging station taper downwards to a smaller footprint, so that the bottom edges 1402 of the charging station fit within the raised lip 1401 of another charging station.

In a further example aspect, the top surface of the beacon that sits in a lower charging station is spaced from the bottom surface of another charging station that sits on top of the lower charging staging.

More generally, a system is provided that includes at least a first charging station and a second charging station. Each charging station includes multiple charging slots for respectively holding multiple tracking beacons. Each charging station can also include a data bus and a power bus connected to each of the multiple charging stations. The body of each charging station includes a stacking feature on a top portion of the body and a complimentary stacking feature on a bottom portion of the body.

In particular, the stacking feature on the top portion of the body on one charging station mechanically interacts with the complimentary stacking feature on the bottom portion of the body of another charging station, so that the two charging stations do not slide off each other. Various types of shapes, protrusions, indents, grooves, etc. can be used to form the stacking feature and complimentary stacking feature.

The first charging station and the second charging station are stackable on top of each other while respectively holding the multiple beacons.

Figure 15:
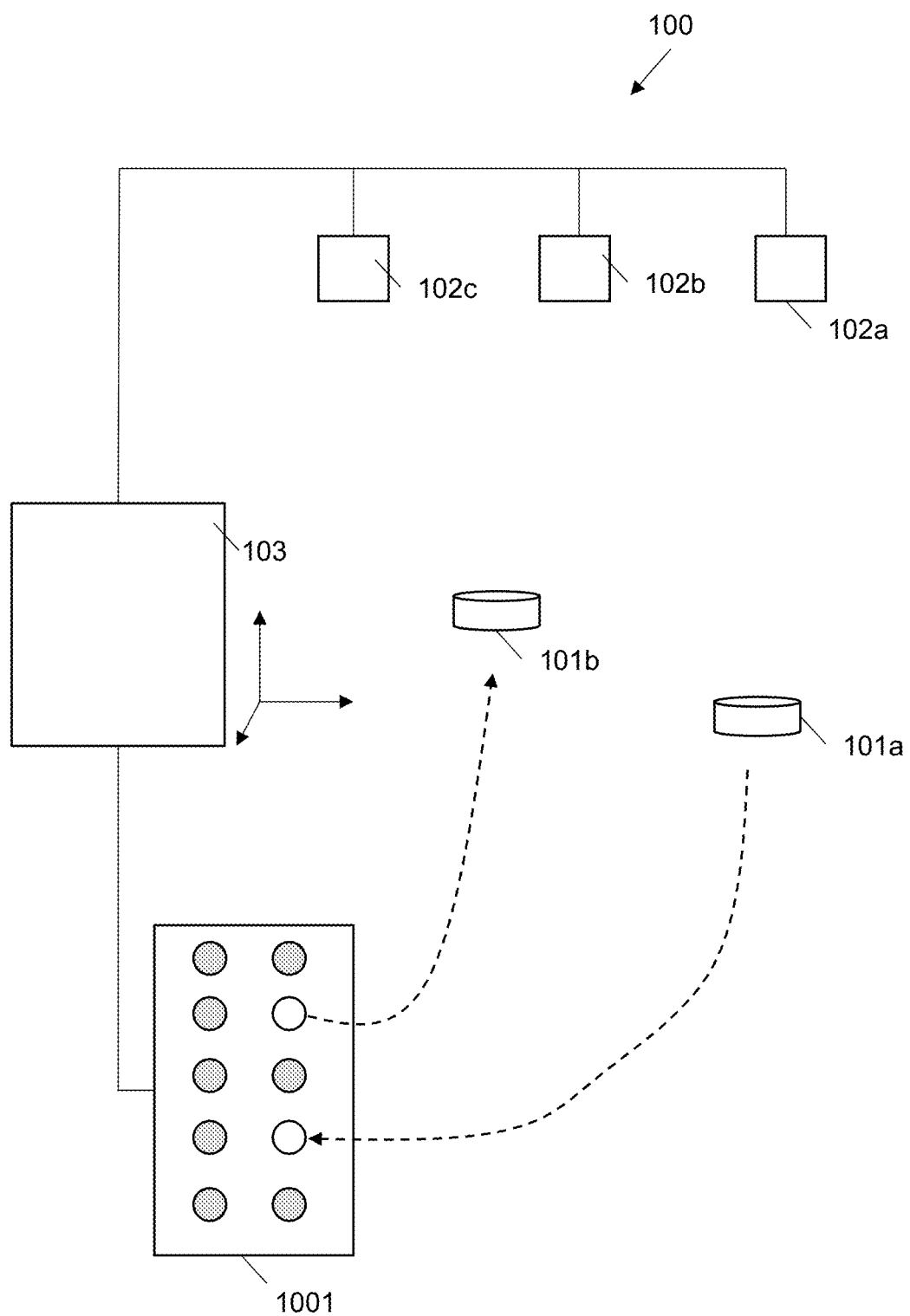
FIG. 15 is an example of a tracking system shown in FIG. 1, and further includes a charging station.

Turning to FIG. 15, an example tracking system 100 shows that the beacons 101b and 101a can be swapped in and out of the charging slots in a charging station. The computer system 103 provides time synchronization data to the charging station, which helps to synchronize the time keeper of the beacons, a time keeper of the computer system 103 and a time keeper of each of the cameras 102a, 102b, 102c. In this way, the active components of the tracking system are synchronized using the same time stamping.

Below are general example embodiments of the systems and devices described herein.

In a general example embodiment, a tracking beacon includes a housing that holds a light emitter that emits infrared light external to the housing. The housing further holds within itself components, and the components comprise: a processor, a memory device, a time keeper, and a battery. One or more electrical connections are positioned on the housing to receive at least electrical power to charge the battery, data defining a blink pattern of the light emitter that is stored on the memory device and controlled by the processor, and a synchronization signal to adjust the time keeper In an example aspect, the data defining the blink pattern further includes a strobe length of time of the light emitter. In an example aspect, the strobe length of time is preset to a value in a range from 1 millisecond to 8 milliseconds.

In another example aspect, the components within the housing further includes a magnet.

In another example aspect, there are multiple electrical connections positioned on the housing. In an alternative example aspect, there is one electrical connection that is a wire connection port configured to interface with a connector of a wire bundle.

In another example aspect, a translucent light diffusing structure forms part of the housing and diffuses the infrared light emitted by the light emitter.

In another general example embodiment, a tracking beacon includes: a housing comprising a first portion and a second portion, the second portion comprising a light diffusing structure; and a light source, a magnet, a processor and a time keeper stored in the housing, wherein the processor and the time keeper control the light source. In an example aspect, the second portion is translucent.

In another general example embodiment, a tracking beacon includes: a housing comprising a lower portion and an upper portion, the upper portion comprising a light diffusing structure; the light diffusing structure comprising a translucent protrusion to diffuse light in different directions; a light source positioned within the housing; and electrical contacts positioned on an external surface of the lower portion.

In an example aspect, the light diffusing structure is translucent.

In another example aspect, the translucent protrusion protrudes downwards from an underside surface of the light diffusing structure.

In another example aspect, there are multiple translucent protrusions comprising upward facing protrusions that protrude upwards from an upper surface of the light diffusing structure.

In another example aspect, a magnet is positioned within the housing.

In another example aspect, the magnet is positioned at a bottom of the lower portion.

In another example aspect, the magnet is offset from a center vertical axis of the housing.

In another example aspect, the lower portion has one or more side walls that extend from a bottom of the lower portion to a top of the lower portion, and taper inwards towards the top of the lower portion.

In another example aspect, the lower portion is opaque.

In another example aspect, the electrical contacts comprise power electrical contacts and data electrical contacts.

In another example aspect, at least one of the data electrical contacts comprise electrical contacts receive a time synchronization signal.

In another example aspect, the data electrical contacts receive a time synchronization signal and receive tracking identity data.

In another example aspect, the electrical contacts are offset from a center vertical axis of the housing.

In another example aspect, the housing comprises a notch.

In another general example embodiment, a kit of parts is provided that includes a wearable strap and a tracking beacon. The wearable strap includes: a housing defining a void therein; and one or more straps attached to the housing, or extending from the housing. The kit of parts also includes a tracking beacon that is removably insertable in the void of the housing, the tracking beacon including: an upper body portion and a lower body portion, and the upper body portion comprising a light diffusing structure. The kit of parts also includes one or more infrared light sources positioned within the tracking beacon.

In an example aspect of the kit of parts, electrical contacts are positioned on an exterior surface the lower body portion.

In another example aspect of the kit of parts, a magnet is positioned within the lower body portion.

In another example aspect of the kit of parts, the light diffusing structure comprises translucent protrusions that diffuse the light in different directions.

In another general example embodiment, a kit of parts is provided that includes a magnetic holder that comprises: a body and a first magnetic component held within in the body. The kit of parts also includes a tracking beacon that comprises: a housing comprising a lower portion and an upper portion, the upper portion comprising a light diffusing structure; and a light source and a second magnetic component are stored in the housing. The first magnetic component and the second magnetic component are magnetically attracted to each other hold the tracking beacon and the magnetic holder together.

In an example aspect of the kit of parts, the body of the magnetic holder comprises sew-through holes to attach the magnetic holder to a material.

In another example aspect of the kit of parts, the body of the magnetic holder comprises a perimeter wall that protrudes higher than the first magnetic component, and the perimeter wall is shaped to encompass at least part of the lower portion of the housing of the tracking beacon. In another example aspect of the kit of parts, the perimeter wall is angled outwards.

In another general example embodiment, a kit of parts is provided that includes a snap clip and a tracking beacon. The snap clip comprises: a planar body and multiple resilient protrusions that extend upwards from the planar body. The tracking beacon comprises: a housing comprising a lower portion and an upper portion, the upper portion comprising a light diffusing structure; and a light source is stored in the housing. The tracking beacon removably is held in the snap clip by placing the tracking beacon between the multiple resilient protrusions, and the multiple resilient protrusions resiliently flex outwards around the housing of the tracking beacon.

In an example aspect of the kit of parts, multiple sew-through holes are defined in the planar body to attach the snap clip to material.

In another general example embodiment, a charging station for tracking beacons is provided. The charging station comprises multiple slots shaped to each receive a given tracking beacon. Each of the slots comprise: power electrical contacts for providing power to a given tracking beacon, data electrical contacts for providing data to the given tracking beacon, and a magnetic component to magnetically attract the given tracking beacon.

In an example aspect of the charging station, each of the slots are circular shaped.

In another example aspect of the charging station, the data electrical contacts and the power electrical contacts are offset to one side of the slot, and the magnetic component is offset to the same one side of the slot.

In another example aspect of the charging station, at least one of the data electrical contacts provides time synchronization data to the given tracking beacon.

In another example aspect of the charging station, the data electrical contacts provide a time synchronization signal and tracking identity data to the given tracking beacon.

In another example aspect of the charging station, the data electrical contacts comprise an electrical contact for resetting a processor of the given tracking beacon, an electrical contact to provide a time synchronization signal, an electrical contact to transmit data, and an electrical contact to receive data.

In an example aspect of the charging station, after detecting that an inserted beacon is positioned in a given slot, the charging station automatically transmits a time synchronization signal to the inserted beacon.

In another general example embodiment, a system is provided that comprises at least a first charging station and a second charging station. Each charging station comprises: multiple charging slots for respectively holding multiple tracking beacons; a data bus and a power bus connected to each of the multiple charging stations; and a body comprising a stacking feature on a top portion of the body and a complimentary stacking feature on a bottom portion of the body. The first charging station and the second charging station are stackable on top of each other while respectively holding the multiple beacons.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, EEPROM, flash memory or other memory technology, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or computing devices or nodes, or accessible or connectable thereto. Any application or module herein described may be implemented using computer readable/executable instructions that may be stored or otherwise held by such computer readable media.

It will be appreciated that different features of the example embodiments of the system, the devices, and the components as described herein, may be combined with each other in different ways. In other words, different devices, modules, operations, functionality and components may be used together according to other example embodiments, although not specifically stated.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

The invention claimed is:

1. A system comprising:
   a charging station comprising multiple charging slots to respectively removably hold and charge multiple wearable tracking beacons, each of the multiple charging slots comprises electrical contacts, and a bus connected to the electrical contacts;
   the multiple wearable tracking beacons are each trackable by external infrared cameras, and a given wearable tracking beacon comprising:
      a housing that holds a light emitter that emits infrared light external to the housing;
      the housing further holding within itself components, the components comprising: a processor, a memory device, a time keeper, and a battery;
      electrical connections are positioned on a lower portion of the housing to receive at least electrical power to charge the battery, data defining a blink pattern of the light emitter that is stored on the memory device and controlled by the processor, and a time synchronization signal to adjust the time keeper; and
      a translucent light diffusing structure forms an upper portion of the housing and scatters the infrared light in different directions;
   wherein after the given wearable tracking beacon is inserted into a given charging slot of the multiple charging slots, the given charging slot automatically starts transmitting the time synchronization signal to the time keeper of the given wearable tracking beacon.

2. The system of claim 1 wherein the time keeper of the given wearable tracking beacon comprises an oscillator, which comprises a crystal, and the time synchronization signal calibrates the oscillator.

3. The system of claim 1 wherein the electrical connections positioned on the housing comprise an input power electrical contact, a data electrical contact, and a common ground electrical contact, and the electrical connections are offset from a center of the housing.

4. The system of claim 1 wherein, after the given wearable tracking beacon is inserted into the given charging slot, the given charging slot transmits the blinking pattern to the given wearable tracking beacon.

5. The system of claim 1 wherein an entirety of the upper portion of the housing of the given wearable tracking beacon translucent.

6. The system of claim 1 wherein the given charging slot further comprises a magnetic component that is offset to a side of the given charging slot, and the given wearable tracking beacon further comprises
   a magnetic component that is positioned offset from a center vertical axis of the housing, and
   wherein the magnetic component in the given wearable tracking beacon and the magnetic component of the given charging slot automatically aligns the electrical connections of the given wearable tracking beacon with the electrical contacts of the given charging slot using magnetic force.

7. The system of claim 1 wherein the entirety of the upper portion of the given wearable tracking beacon is a translucent light diffusing structure that comprises one or more translucent protrusions to diffuse light in different directions.

8. A kit of parts comprising the charging station and the multiple wearable tracking beacons of claim 1, and a wearable holder that removably holds the housing of the wearable tracking beacon.

9. The kit of parts of claim 8 wherein the wearable holder removably holds the given wearable tracking beacon by magnetic force.

10. The system of claim 1 further comprising one or more additional charging stations, and the charging station and the one or more additional charging stations are networked together in a daisy-chain configuration.

11. The system of claim 10 wherein the charging station transmits the time synchronization signal to the one or more additional charging stations.

12. A wearable tracking beacon, which is trackable by one or more external infrared cameras, the wearable tracking beacon comprising:
   a housing sized to be carried on a wrist and the housing comprising a lower portion and an upper portion, and the upper portion is entirely a translucent light diffusing structure;
   the translucent light diffusing structure comprising one or more translucent protrusions configured to diffuse light in different directions;
   an infrared light source, a battery, a processor, and a time keeper are positioned within the housing; and
   one or more electrical connections are positioned on the lower portion.

13. The wearable tracking beacon of claim 12 wherein the housing is circular and the one or more translucent protrusions comprises concentric rings.

14. The wearable tracking beacon of claim 12 wherein the one or more translucent protrusions protrudes downwards from an underside surface of the translucent light diffusing structure.

15. The wearable tracking beacon of claim 12 wherein there are multiple translucent protrusions comprising upward facing protrusions that protrude upwards from an upper surface of the light diffusing structure.

16. The wearable tracking beacon of claim 12 further comprising a magnet that is positioned within the housing and at the lower portion, and wherein the wearable tracking beacon is insertable into a slot or a holder of another device and the magnet holds the wearable tracking beacon to the slot or the holder.

17. The wearable tracking beacon of claim 12 wherein the housing is circular; the wearable tracking beacon further comprises a magnet positioned within the housing that is offset from a center vertical axis of the housing; and, the wearable tracking beacon is insertable into a slot of another device and magnetic force automatically aligns the one or more electrical connections within the slot.

18. The wearable tracking beacon of claim 12 wherein the lower portion has one or more side walls that extend from a bottom of the lower portion to a top of the lower portion, and taper inwards towards the top of the lower portion, and at least the lower portion of the wearable tracking beacon is insertable into a snap clip.

19. A kit of parts comprising the wearable tracking beacon of claim 12, and a wearable holder that removably holds the lower portion of the wearable tracking beacon.

20. The kit of parts of claim 19 wherein the wearable holder comprises a magnetic component and the wearable tracking beacon further comprises a magnet, and wherein the wearable holder removably holds the wearable tracking beacon by magnetic force.

* * * * *